United States Patent [19]

Shibata et al.

[11] 4,241,095

[45] Dec. 23, 1980

[54] METHOD FOR PREVENTING SOY SAUCE FROM PUTREFACTION

[75] Inventors: Kunihiko Shibata, Aichi; Genji Yamaguchi, Nagoya; Kimio Takeda; Hiroshi Masai, both of Handa, all of Japan

[73] Assignee: Nakano Vinegar Co., Ltd., Handa, Japan

[21] Appl. No.: 965,911

[22] Filed: Dec. 4, 1978

[51] Int. Cl.³ .............................................. A21D 4/00
[52] U.S. Cl. .................................. 426/335; 426/330; 426/532; 426/589; 426/654
[58] Field of Search .............. 426/654, 321, 331, 557, 426/634, 650, 643, 46, 589, 330, 335, 532, 44

[56] References Cited

U.S. PATENT DOCUMENTS

| | | | |
|---|---|---|---|
| 2,593,223 | 4/1952 | Trelease et al. | 426/321 |
| 3,692,534 | 9/1972 | Ueno et al. | 426/331 |
| 3,711,303 | 1/1973 | Luksas et al. | 426/46 |
| 3,734,748 | 5/1973 | Ueno et al. | 426/331 |
| 3,899,594 | 8/1975 | Nickerson et al. | 426/321 |
| 4,028,470 | 6/1977 | Hayashi et al. | 426/589 |
| 4,076,850 | 2/1978 | Nickerson et al. | 426/335 |
| 4,115,591 | 9/1978 | Noda et al. | 426/46 |
| 4,117,169 | 9/1978 | Noda et al. | 426/46 |

OTHER PUBLICATIONS

Yong et al., "Microbiology and Chemistry of Soy Sauce Fermentation", Advances in Applied Microbiology, vol. 17, pp. 157–194, 1974.
Smith et al., "Fermented Soybean Food Product", *Soybeans: Chemistry and Technology*, pp. 397–401, 1972.

Primary Examiner—Raymond N. Jones
Assistant Examiner—George C. Yeung
Attorney, Agent, or Firm—Frishauf, Holtz, Goodman & Woodward

[57] ABSTRACT

A method for preserving soy sauce which comprises admixing therewith acetic acid and a salt of acetic acid, propionic acid, butyric acid, malic acid, tartaric acid, citric acid or lactic acid. The amount of the acid salt is in excess of the amount of acetic acid. The method provides a sufficient antiseptic effect without producing a sour taste and without greatly lowering the pH.

4 Claims, No Drawings

METHOD FOR PREVENTING SOY SAUCE FROM PUTREFACTION

BACKGROUND OF THE INVENTION

In order to improve the preservability of foods, various kinds of preservatives have been used. Examples of these preservatives are synthetic preservatives such as sodium propionate, calcium propionate; acids such as acetic acid; and alcohols. However, it has been apt to be restricted by law to apply synthetic preservatives to foods. Addition of acetic acid to food is disadvantageous in that acidity is caused to occur in the food and its pH value is lowered to spoil the quality of the food. Similarly, alcohols when they are added to food in an amount enough to bring about sufficient antiseptic effect, give to the food an alcoholic smell and cause loss of original flavour of said food.

There have been disclosed in some Published unexamined patent applications (Kôkai tokkyo kôhô) some methods for conquering the above-mentioned defects. These methods are similar in that a solution prepared by adding one or more of materials selected from the group consisting of egg shell, sodium bicarbonate and sodium hydroxide to a vinegar in a certain ratio, is applied to a specific food to be added. Examples of these patent applications are as follows; Published unexamined patent applications (Kôkai tokkyo kôhô) (hereinafter referred to as P.U.P.A.) No. 15847/77 (laid open, Feb. 5, 1977; Seasoned nameko), P.U.P.A. No. 15849/77 (laid open, Feb. 5, 1977; Gelidium jelly), P.U.P.A. No. 21341/77 (laid open, Feb. 17, 1977; Gyoza), P.U.P.A. No. 21360/77 (laid open, Feb. 17, 1977; Grilled egg), P.U.P.A. No. 21399/77 (laid open, Feb. 17, 1977; Miso), P.U.P.A. No. 34952/77 (laid open, Mar. 17, 1977; Fresh fermented pickles), P.U.P.A. No. 34953/77 (laid open, Mar. 17, 1977; Processed octopus), P.U.P.A. No. 90643/77 (laid open, July 30, 1977; Noodles), P.U.P.A. No. 99294/77 (laid open, Aug. 19, 1977; Mirin seasonings), P.U.P.A. No. 145551/77 (laid open, Dec. 3, 1977; Grated ginger), P.U.P.A. No. 148698/77 (laid open, Dec. 10, 1977; Soy), P.U.P.A. No. 96341/78 (laid open, Aug. 23, 1978; Noodles), and P.U.P.A. No. 96350/78 (laid open, Aug. 23, 1978; Fresh fermented pickles).

However, these prior art methods have been determined for and invented independently for different kinds of foods so that said solution can be effectively applied to the food concerned with their invention. Consequently, these prior art methods do not show anything about whether said solution is also effective for foods other than in their invention and under what conditions said solution is applicable for other kinds of foods. Foods are diversified in their materials, and it is well known that various food products can be made when the processing is carried out under different conditions, even though they started from the same materials. Accordingly, it is necessary to use "Trial and Error Procedure" for determining foods to which some preservatives are applicable as well as the way how to apply these preservatives.

SUMMARY OF THE INVENTION

According to the present invention, there has been provided an effective method for preventing foods from putrefaction, which comprises adding (A) acetic acid and (B) acetate or other organic acid salt to foods to be treated either during or after the processing thereof in such a ratio by weight so that the amount of latter (B) will be more than the former (A) in the foods. This invention is especially concerned with soy as foods.

DETAILED DESCRIPTION OF THE INVENTION

The method for preventing foods from putrifying, according to this invention, may be applied effectively for many kinds of foods such as kamaboko (boiled fish paste), chikuwa, boiled noodles, pickles, miso, soy, season soy for grill, packed rice cake, bread, cakes, hamburgers, tōfu (bean curd), ham, sausage, household dishes, bottled nameko, dainties, salad, etc.

Acetic acid materials to be used in this invention include fermented vinegar, synthetic vinegar and aqueous acetic acid, and acetic acid salts used in this invention may include, for example, sodium acetate, potassium acetate, magnesium acetate, calcium acetate.

Other organic acid salts such as sodium propionate, sodium butyrate, sodium malate, sodium tartarate, sodium citrate, potassium citrate, sodium lactate and potassium lactate can also be used in this invention.

In this invention, (A) acetic acid and (B) acetate or other organic acid salt can be added to foods either during the processing of said foods, that is, at an appropriate step during processing starting from raw materials until the final product or to the final product itself.

In this treatment, (A) acetic acid and (B) acetate or other organic acid salt should be added in such a manner that the amount of the latter (B) is more than that of the former (A). More particularly, in a ratio by weight of the former (A) to the latter (B) as above 1:1, preferably in 1:2–6 in the food. Acetic acid and acetate or other organic acid salt may be added separately or simultaneously.

As an alternative to separate or simultaneous addition of acetic acid and acetate, acetic acid may be added first and then a caustic alkali such as sodium hydroxide added to form an acetate such as sodium acetate therein so that the amount of acetate by weight is larger than the acetic acid. Furthermore, it is preferable to add acetic acid in such a way that the concentration thereof in food will be from 0.01 to 0.7 percent. The larger the amount of an acetate or an other organic acid salt added to acetic acid, the higher the pH value of the solution becomes. For example, the ratio by weight of acetic acid to sodium acetate of 5:5, the pH value is 4.54; for 4:6, the pH value is 4.70; for 3:7, pH value is 4.96; for 2:8, pH value is 5.21 and for 1:9, the pH value is 5.57. The pH value can increase in this way thereby lessening the acidity in foods.

However, even under a higher pH value, acetic acid molecules are still present therein and they may cause inhibition of growth of microorganisms. Consequently, even under a higher pH value, if many acetic acid molecules are present therein the growth inhibition of microorganisms may become larger. Thus, according to this invention, acetic acid and an acetate or an other organic acid salt may be added to food either during the processing thereof or to the final product itself in such a ratio by weight that the latter is more than the former so that the food may be endowed with buffer action and the pH value thereof may be raised to lessen the acidity while maintaining the antiseptic activity of acetic acid molecules. Accordingly, this invention is extremely useful as a method for preventing foods, particularly soy from putrefaction.

This invention is explained below with reference to a method for production of soy as an example which can be preserved over a long period without loss of the original flavour of soy. With reference to soy of which utility as a seasoning is well known, it has been often observed that at a higher temperature molds often grow in bottled or canned soy within only a few days after opening them.

Alcohol has been added in order to improve preservability of soy, however, alcohol in an amount sufficient to give soy preservability often gives an alcoholic smell to soy so that the original flavour of soy is often extremely lost and the nature of the soy product is lower.

The object of this invention is to provide a method for preventing soy from putrefaction, without any of the faults mentioned above.

Solutions to be used in this invention may be prepared by adding one or more materials selected from the group consisting of egg shell, sodium bicarbonate and sodium hydroxide (hereinafter referred to as egg shell etc.) to a vinegar in such an amount as 0.29–1.10 parts, more specifically in such amount as 0.6–1.10 parts for the case of egg shell or sodium bicarbonate each added singly, or in such amount as 0.29–0.53 part for the case of sodium hydroxide added singly, each by weight based on the weight of acetic acid (as 1 part) in vinegar, so that the weight % of acetates (Ca, K and other salts) may be higher than that of acetic acid. The solution prepared may be added to raw and uncooked soy either before or after sterilization of said soy.

Said solution to be used in this invention as described above, may be prepared by adding a certain amount of egg shell etc. to a vinegar, and it is preferable to mix them in such a way that the proportion of egg shell to acetic acid may be (0.29–1.10):1. Thus, a part of acetic acid in a vinegar can be converted into an acetate to obtain a solution where two substance coexist.

If necessary, the weight % of acetic acid may be controlled by the addition of water. It is further preferable to make the weight % of acetates in said solution higher than that of acetic acid and to keep at least 20% by weight of total acetic acid in a vinegar in the form of acetic acid, from the view point of foods flavours.

In this invention, vinegar means acetic acid itself as well as fermented vinegar and synthetic vinegar. Acetates means sodium acetate, potassium acetate, calcium acetate and magnesium acetate.

Alternatively, it is possible to mix acetic acid with acetates to prepare the desired solution for this invention. The addition of the solution into raw uncooked strong or weak soy can be effected either before or after the sterilization of said soy.

The solution used in this treatment should be added in such a ratio that the weight % of acetic acid may be 0.02–0.2% by weight.

Weight % of acetic acid below 0.02% is responsible for imperfect antiseptic effect, on the contrary, weight % of acetic acid above 0.2% makes the effect sufficient but has a bad effect on flavour and taste of soy.

According to this invention, there is obtained a soy which is free from growth of molds therein and damages of flavour and taste over a long period of time after opening vessels such as bottles and cans.

The following are examples of this invention.

EXAMPLE 1

(a) Preparation of solution

To 1 liter of fermented vinegar having an acetic acid concentration of 10%, 30 grams of egg shell, 14.0 grams of sodium bicarbonate and 6.67 grams of sodium hydroxide were added and they were mixed.

The solution thus prepared has an acetic acid concentration of 5% and pH value of 4.8.

(b) Preparation of strong soy

To 100 parts by volume of fresh uncooked strong soy which was brewed and squeezed in a conventional manner, the solution prepared as mentioned above was added and mixed respectively in amounts of 1%, 2%, 3%, 4% and 5% each by volume.

Up to 500 milliliters of each of the mixed solutions so obtained was charged into a 900 milliliter glass bottle, and the sterilized in a water bath at 75° for 10 minutes. After sterilization, the solution in each glass bottle was sealed and served as the final products for testing.

Fresh and uncooked soy before sterilization contained total nitrogen 1.65%, NaCl 18.0% and ethyl alcohol 0.95%.

(c) Film yeast growth test

Final products prepared as described above were placed in an incubator at 30° C. and examined for the growth of film yeasts therein for a certain period.

The results are shown in Table 1.

TABLE 1

| Sample | Preservation period (day) | | | | | | | | | | |
|---|---|---|---|---|---|---|---|---|---|---|---|
|  | 3 | 5 | 6 | 7 | 8 | 9 | 10 | 11 | 15 | 20 | 30 |
| no addition | − | + | + | ++ | ++ | ++ | ++ | ++ | ++ | ++ | ++ |
| 1% added | − | − | − | − | − | − | ± | ± | + | + | ++ |
| 2% added | − | − | − | − | − | − | − | − | ± | ± | ± |
| 3% added | − | − | − | − | − | − | − | − | − | − | − |
| 4% added | − | − | − | − | − | − | − | − | − | − | − |
| 5% added | − | − | − | − | − | − | − | − | − | − | − |

Note:
−; no growth
±; scanty growth
+; growth
++; abundant growth (d) Sensory evaluation test (flavour and taste)

Sensory evaluation test was conducted for each sample of soy product prepared as mentioned above which preserved for one day. The evaluation test was carried out using paired difference test by 30 panels.

The results are shown in the Table 2 below;

TABLE 2

| Judgement | Sample (amount of the solution added to soy) | | | | |
| --- | --- | --- | --- | --- | --- |
|  | 1% | 2% | 3% | 4% | 5% |
| number of people preferring products without additive | 15 | 15 | 16 | 19 | 22 |
| number of people preferring products with additive | 15 | 15 | 14 | 11 | 8 |

EXAMPLE 2

Fresh uncooked weak soy which was brewed and squeezed in a conventional manner containing total nitrogen 1.30%, NaCl 17.8%, ethyl alcohol 0.76% was sterilized at 75° C. for 15 minutes to obtain a weak soy product.

Up to 500 milliliters of said soy product was added to 900 milliliter glass bottles, and then 15 milliliters of the respective solutions prepared in Example 1 added to each of said bottles in an amount of 3% by weight and each of the bottles was then closed to serve as the final products. The weak soy product showed no growth of film yeasts even after 30 days storage in an incubator at 30° C.

In the sensory evaluation test (paired difference test), the said final products with the additive were not distinguishable at all from the products without the additive (15 milliliters of tap water was added in place of said solution).

From the results in Example 1 and 2, it was found that according to the present invention, it was possible to prevent growth of film yeasts in soy for a long period without any damage to the soy flavour.

What is claimed is:

1. A method for preventing soy sauce from spoiling comprising adding to raw uncooked soy sauce before or after sterilization, a preservative solution in an amount sufficient to prevent the soy sauce from spoiling, said preservative solution consisting essentially of (a) acetic acid and (b) a salt selected from the group consisting of the sodium salt, the potassium salt, and the calcium salt of an organic acid selected from the group consisting of acetic acid, malic acid, tartaric acid, citric acid, and lactic acid, said preservative solution being added in an amount such that the content of acetic acid in the soy sauce is between 0.02 and 0.2 percent by weight, and said preservative solution containing an amount by weight of said salt which is in excess of the amount of acetic acid up to 6 times the amount of acetic acid.

2. The method of claim 1 wherein said preservative solution is prepared by adding at least one material selected from the group consisting of egg shell, sodium bicarbonate, and sodium hydroxide to vinegar, whereby when said material which is added to said vinegar is only egg shell or sodium bicarbonate, it is added in an amount between 0.6 and 1.1 parts per part of acetic acid, and when it is sodium hydroxide, it is added in an amount between 0.29 and 0.53 parts per part of acetic acid, whereby the amount of acetate formed by the reaction of said material and acetic acid in the vinegar is larger than the amount of acetic acid present.

3. The method of claim 1 or claim 2 wherein the preservative solution contains between 2 and 6 times by weight of said salt as said acetic acid.

4. The method of claim 3 wherein said acid salt is an acetate.

* * * * *